United States Patent [19]

Sakamura et al.

[11] Patent Number: 4,941,085
[45] Date of Patent: Jul. 10, 1990

[54] DATA PROCESSING SYSTEM HAVING APPARATUS FOR INCREASING THE EXECUTION SPEED OF BIT FIELD INSTRUCTIONS

[75] Inventors: Ken Sakamura, No. 105, 12-30 Shiroganedai 3-chome, Minato-ku, Kodaira-shi, Tokyo; Takuichiro Nakazawa, Kodaira; Atsushi Hasegawa; Ikuya Kawasaki, both of Koganei; Kazuhiko Iwasaki, Hachiohji, all of Japan

[73] Assignees: Ken Sakamura; Hitachi, Ltd.; Hitachi Microcomputer Engineering Ltd., all of Tokyo, Japan

[21] Appl. No.: 87,308

[22] Filed: Aug. 20, 1987

[30] Foreign Application Priority Data

Aug. 27, 1986 [JP] Japan .................................. 61-198870

[51] Int. Cl.⁵ .......................... G06F 9/30; G06F 9/308; G06F 9/355; G06F 12/04
[52] U.S. Cl. .................................. 364/200; 364/252.3; 364/252.6; 364/254.9; 364/255.1; 364/255.4; 364/255.5; 364/262.4; 364/262.8; 364/259.8; 364/246.2
[58] Field of Search ... 364/200 MS File, 900 MS File

[56] References Cited

U.S. PATENT DOCUMENTS

| | | | |
|---|---|---|---|
| 3,680,058 | 7/1972 | DeSantis et al. | 340/172.5 |
| 4,103,329 | 7/1978 | Davis et al. | 364/200 |
| 4,109,310 | 8/1978 | England et al. | 364/200 |
| 4,272,828 | 6/1981 | Negi et al. | 364/900 |
| 4,466,056 | 8/1984 | Tanahashi | 364/200 |

Primary Examiner—Archie E. Williams, Jr.
Assistant Examiner—Emily Y. Chan
Attorney, Agent, or Firm—Antonelli, Terry, Stout & Kraus

[57] ABSTRACT

In addition to an ordinary bit field instruction without limitation which makes use of an offset value and a field width, a bit field instruction with limitation which does not calculate the spread of the bit field is separately installed. In the present invention the calculation for determination of the spread of the bit field is not performed when the bit field instruction with limitation is executed. In addition, when executing a bit field instruction with limitation, the offset value and the field width can be obtained directly as immediate values thereby decreasing the execution time of the instruction.

6 Claims, 7 Drawing Sheets

FIG. 1A
BIT FIELD INSTRUCTION WITHOUT LIMITATION

FIG. 1B
BIT FIELD INSTRUCTION WITH LIMITATION

DATA PROCESSING SYSTEM HAVING APPARATUS FOR INCREASING THE EXECUTION SPEED OF BIT FIELD INSTRUCTIONS

BACKGROUND OF THE INVENTION

The present invention relates to data processing technology and further to particularly effective technology to be applied to instruction form in program control system, for example, to effective technology to be utilized in a microprocessor having instruction regarding processing of data called bit field.

In the prior art, for example, in a microprocessor such, as, MC68020 manufactured by Motorola, several sorts of instructions regarding processing of data in an area from arbitrary bit to arbitrary bit within a memory called bit field are prepared (the instruction being hereinafter referred to as "bit field instruction").

Figure 2A:
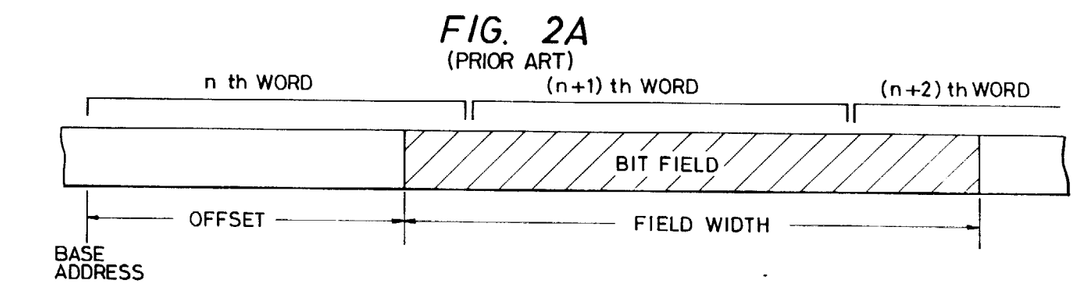
FIG. 2A is an explanation diagram illustrating a bit field with boundary spreading.

In the bit field instruction, as shown in FIG. 2A, three values, i.e., base address BAD, offset value Off from the base address, and field width WD indicating field length (bit number), are given as operand, thereby a required field within the memory is assigned, and logical operation processing such as AND operation or OR operation is performed to data in the field.

In the above-mentioned case, since the bit field is assigned in bit unit from arbitrary bit to arbitrary bit within the memory, it may spread through two or more words each being a read/write unit within the memory as shown in FIG. 2A. For example, when the field spreads through two words, in order to obtain information of all bits to constitute the bit field, two word addresses must be operated and the memory must be accessed twice. Consequently, in a microprocessor such as MC68020, during execution of the bit field instruction, confirmation is performed regarding whether the bit field spreads through two or more words based on the base address, the offset value and the field width, and then reading from the memory is performed.

Figure 2B:
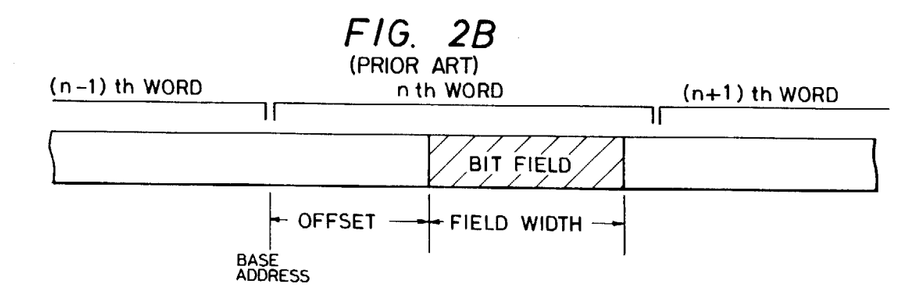
FIG. 2B is an explanation diagram illustrating a bit field without boundary spreading.

However, the bit field does not always spread through two or more words but may be contained within one word as shown in FIG. 2B. In a microprocessor of the prior art, however, even in such case, confirmation is always performed regarding whether the bit field spreads over two or more words (hereinafter referred to as "boundary spreading"), and then reading is performed. Accordingly, due to the confirmation a problem exists in that the execution time of the bit field instruction becomes long although not necessary.

SUMMARY OF THE INVENTION

An object of the invention is to provide an instruction form which can decrease the execution time of the bit field instruction.

The foregoing and other objects and novel features of the invention will be apparent from the description of the specification and the accompanying drawings.

Outline of typical invention disclosed herein will be described as follows.

In the present invention, in the bit field instruction, the bit field as an object may be previously known not to exceed one word during the program execution. Therefore, the present invention provides in addition to an ordinary bit field instruction without limitation in the offset value and the field width, a bit field instruction with limitation. The bit field instruction without limitation operates on a bit field that spreads through two or more words and the bit field instruction with limitation operates on a bit field that contained on one word. The bit field instruction is separately installed which takes an instruction form having an assignment portion for giving the offset value and the field width as immediate value. Operation codes in the instruction indicates whether to discriminate the boundary spreading based on the offset value and the field width.

According to the above-mentioned means, when the bit field instruction with limitation is executed, calculation for the discrimination of the boundary spreading is not performed based on the offset value and the field width. Being that the offset value and the field width can be directly obtained as immediate value, thereby decreasing the instruction execution time of the bit field instruction with limitation in comparison to the bit field instruction without limitation.

DESCRIPTION OF THE PREFERRED EMBODIMENTS

Figure 1A:
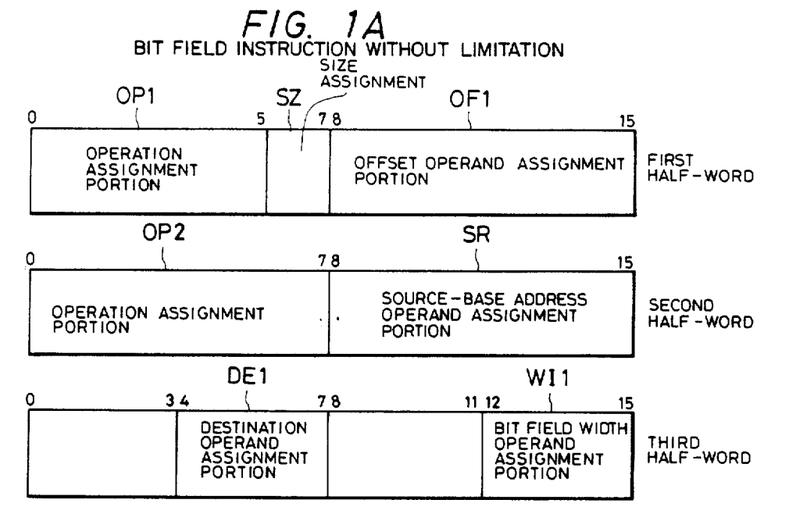
FIG. 1A is an example of a format of a bit field instruction without limitation according to the invention.
Figure 1B:
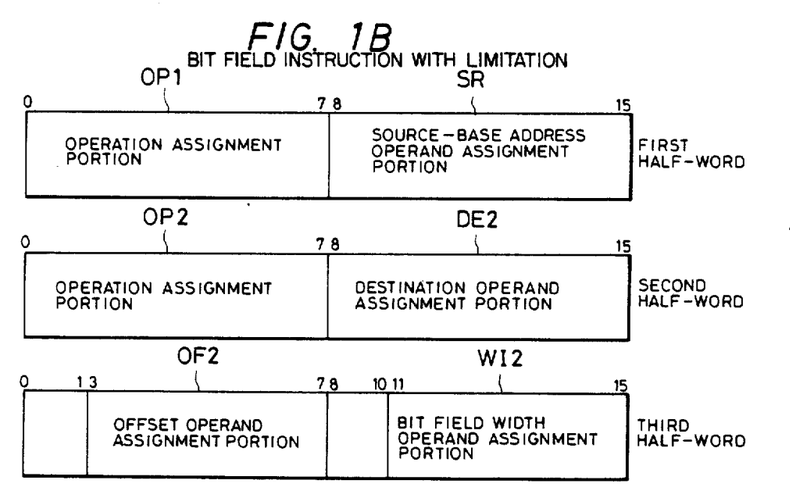
FIG. 1B is an example of a format of a bit field instruction with limitation according to the invention.

FIG. 1A shows an example of format of a bit field instruction without limitation in offset value and field width, and FIG. 1B shows an example of format of bit field instruction with limitation respectively. Limitation in this case means that the bit field does not spread through two words. More specifically, when one word of the memory has a length of 32 bits, the instruction has conditions that the offset value is 31 or less and sum of the offset value and the field width is 32 or less.

Since the invention is directed to a microprocessor using 16 bits as instruction read unit, each instruction is composed of three half-words (16 bits).

A first half-word of the bit field instruction without limitation shown in FIG. 1A is composed of an operation assignment portion OP1, a size assignment portion SZ indicating length of the operation, and an offset value operand assignment portion OF1. The length of the operation (SZ) indicates the number of bits which are fetched by one access. Among them, the offset value operand assignment portion OF1 is composed of an addressing mode assignment portion and a register number assignment portion where the offset value is obtained by register indirect addressing using a register assigned in the register assignment portion.

A second half-word of the bit field instruction without limitation is composed of an operation assignment portion OP2 and a source-base address operand assignment portion SR. Among them, the source-base address operand assignment portion SR is composed of an addressing mode assignment portion and a register number assignment portion where the base address is obtained by register indirect addressing using a register assigned in the register assignment portion. Operation codes are stored within the operation assignment portions OP1, OP2 of the first half-word and the second half-word respectively and indicates whether the instruction is a bit field instruction without limitation or a bit field instruction with limitations.

In a third half-word of the bit field instruction without limitation, a destination operand assignment portion DE1 and a bit field width operand assignment portion WI1 are installed. Each of the destination operand assignment portion DE1 and the bit field width operand destination portion WI1 is composed of 4 bits, and one of 16 general-purpose registers is assigned as a register containing the destination address and the bit field width (register direct addressing).

A first half-word of the bit field instruction with limitation shown in FIG. 1B is composed of an operation assignment portion OP1 and a source-base address operand assignment portion SR. Among them, the source-base address operand assignment portion SR is the same as the assignment portion SR installed in the second half-word without limitation of FIG. 1A, and the base address is obtained by register indirect addressing.

A second half-word of the bit field instruction with limitation is composed of a second operation assignment portion OP2 and a destination operand assignment portion DE2. In this instruction, the destination operand assignment portion DE2 is composed of an addressing mode assignment portion and a register number assignment portion, and the destination is assigned by address contained in the assigned register (register indirect addressing).

In a third half-word of the bit field instruction with limitation, an offset value operand assignment portion OF2 and a bit field width operand assignment portion WI2 are installed. In this embodiment, each of the assignment portions OF2 and WI2 is composed of 5 bits and made an immediate portion, and the offset value is entered in the assignment portion OF2 and the bit field width is entered in the assignment portion WI2.

In the bit field instruction with limitation, assignment of one bit is allowed as the bit field width. In this case, a so-called bit operation installed to perform an operation to any one bit within the memory may be omitted.

Figure 3:
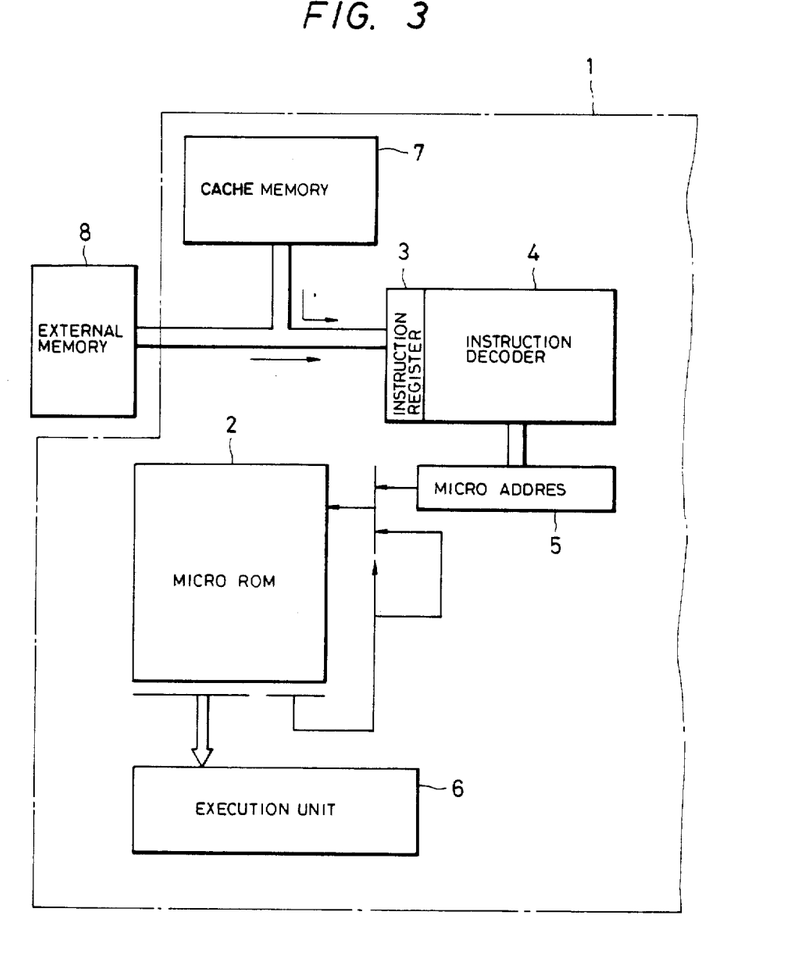
FIG. 3 is a block diagram of a microprocessor executing a bit field instruction as an embodiment of the invention.
Figure 4:
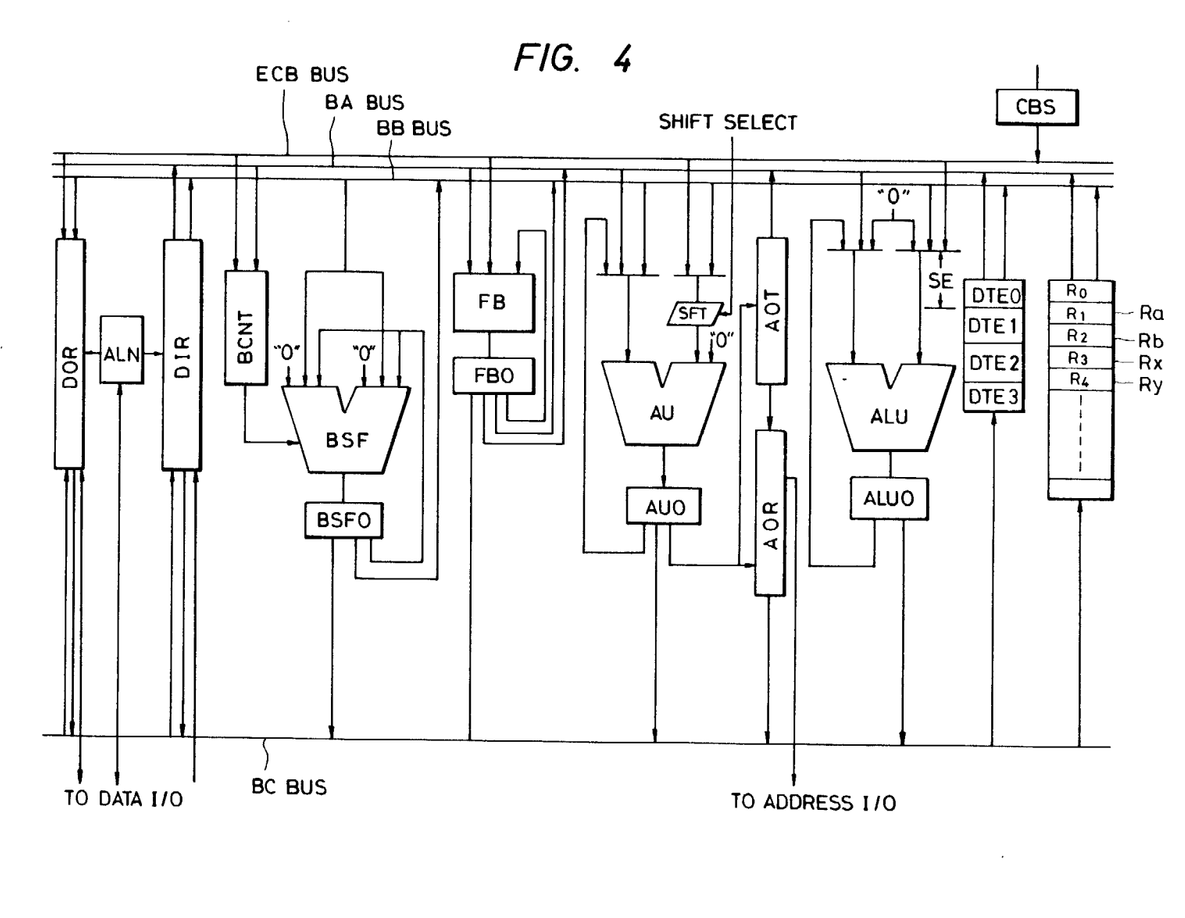
FIG. 4 is a block diagram of an execution unit of the microprocessor as an embodiment.

FIG. 3 shows an example of hardware constitution of a microprocessor operated by an instruction system having the bit field instruction according to the invention, and FIG. 4 shows a constitution example of an execution unit thereof.

The microprocessor of the embodiment is provided with a control unit of a microprogram control system. That is, a micro ROM (read only memory) 2 to store the microprogram is installed within an LSI chip 1 are included within the microprocessor. The micro ROM 2 is accessed by a micro address generator 5, and outputs micro instructions which are included within the microprogram in sequence.

The code of macro instruction fetched to an instruction register 3 is decoded by an instruction decoder 4, and the decoded signal is supplied to the micro address generator 5. The micro address generator 5 forms a corresponding micro address based on the signal, and supplies it to the micro ROM 2. Thereby an initial instruction of a series of micro instruction groups to execute the macro instruction is read. According to the micro instruction code, a control signal to an execution unit 6 comprising various temporary registers, data buffers, operation logical unit or the like is formed.

Among a series of micro instruction groups corresponding to the macro instruction, reading of a second micro instruction or later is performed based on the next address in the micro instruction just before it and the address from the micro address generator 5 since a code of a next address of the micro instruction read immediately before it is supplied to the micro ROM 2. Thus the execution unit 6 is controlled by a control signal formed in reading of a series of micro instructions and the macro instruction is executed.

In the embodiment, a buffer memory system is adopted although not particularly limited thereto, and a cache memory is installed within the microprocessor LSI and program data with high access frequency among data in an external memory 8 is registered in the cash memory 7. Thereby the program is fetched at high speed.

On the other hand, in an execution unit of FIG. 4, circuit symbol CBS designates a register for latching expanded data such as offset value or field width, DOR designates a data output register for latching data to be stored in the memory, DIR designates a data input register for latching data read from the memory, and ALN designates an aligner for aligning data inputted or outputted. The ALN is connected through a data I/O interface (not shown) to an external data bus.

Also circuit symbol BSF designates a barrel shifter for extracting arbitrary 32 bits from data of 64 bits inputted, and the barrel shifter BSF can directly input constant such as 0. BCNT designates a barrel shifter counter for assigning the extraction position to the barrel shifter BSF, and BSFO designates a register for latching output of the barrel shifter BSF. FB designates a function block having a function of inputting data and outputting data having the upper 27 bits masked, and FBO designates a register for latching an output of the function block FB.

Further, circuit symbol AU designates an address operation unit for calculating effective address, and the address operation unit AU can directly input a constant such as 0. AUO designates a register for latching an output of the address operation unit AU. SFT designates a shifter for shifting data before calculation by the address operation unit AU, AOT designates a latch circuit for temporarily holding value of the register AUO containing the calculation result while the value is transferred to temporary registers DTE0~DTE3 as hereinafter described, and AOR designates an address output register for temporarily holding address value of the register AUO while the value is outputted to outside. The register AOR is connected through an address I/O interface (not shown) to an external address bus.

On the other hand, circuit symbol ALU designates an arithmetic logical unit for performing arithmetic operations such as addition or subtraction and logical operations, and ALUO designates a register for latching the operation result in the arithmetic logical unit ALU. DTE0~DTE3 designate register group without viewing from outside for latching temporary values, and $R_o$, $R_1, \ldots, R_{15}$ designate general-purpose register group opened for users. The above-mentioned various registers, latch circuits, operation units and the like are connected to each other through four types of buses ECB, BA, BB, BC, and sequentially operated by control signals supplied from the control unit comprising the micro ROM, thereby the corresponding macro instruction is executed. Among the general-purpose register group $R_o \sim R_{15}$, registers additionally designated by symbols Ra, Rb, Rx, Ry are those used for entering source-base address, destination address, offset value address and bit field value respectively. The registers Ra, Rb, Rx, Ry can be used in assigning arbitrary register numbers of the general-purpose registers $R_o \sim R_{15}$ for respective use objects.

Figure 5:
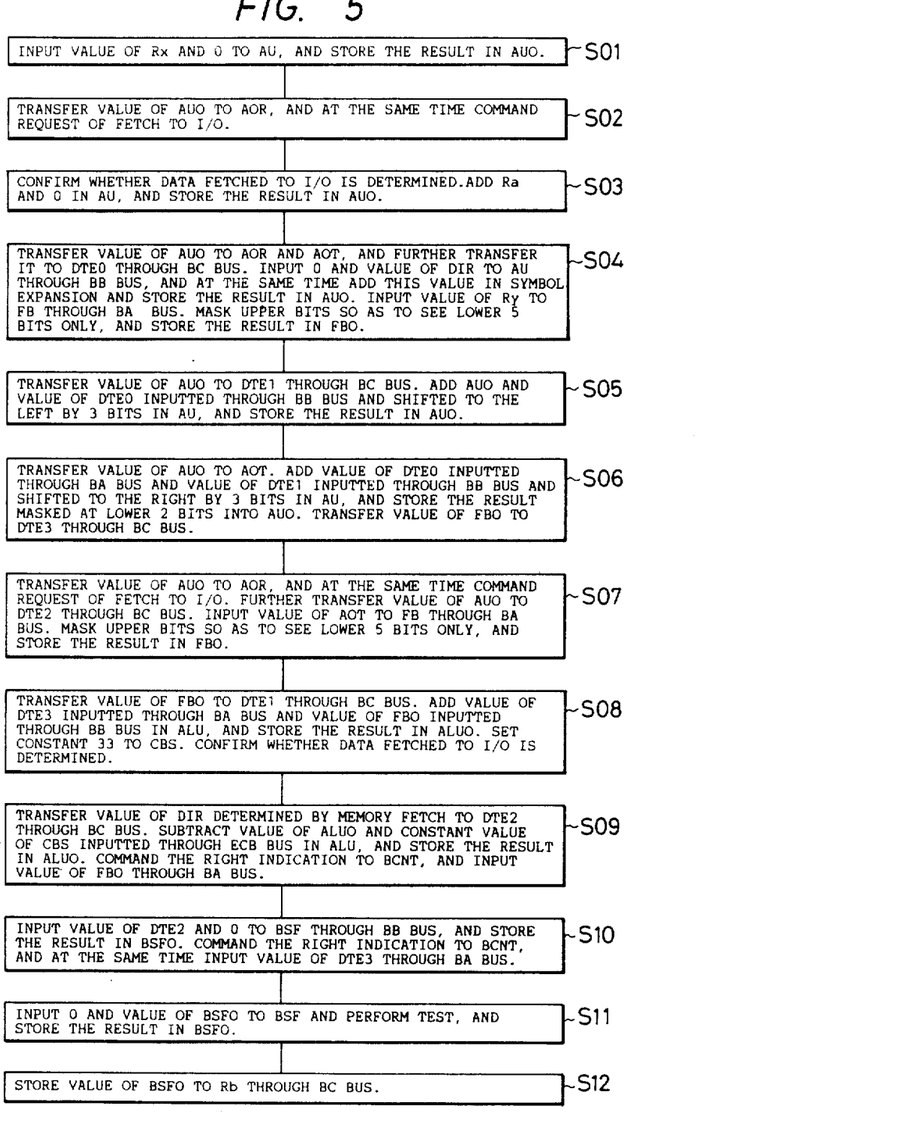
FIG. 5 is a flowchart illustrating an execution procedure of a bit field instruction without limitation according to the invention.
Figure 6:
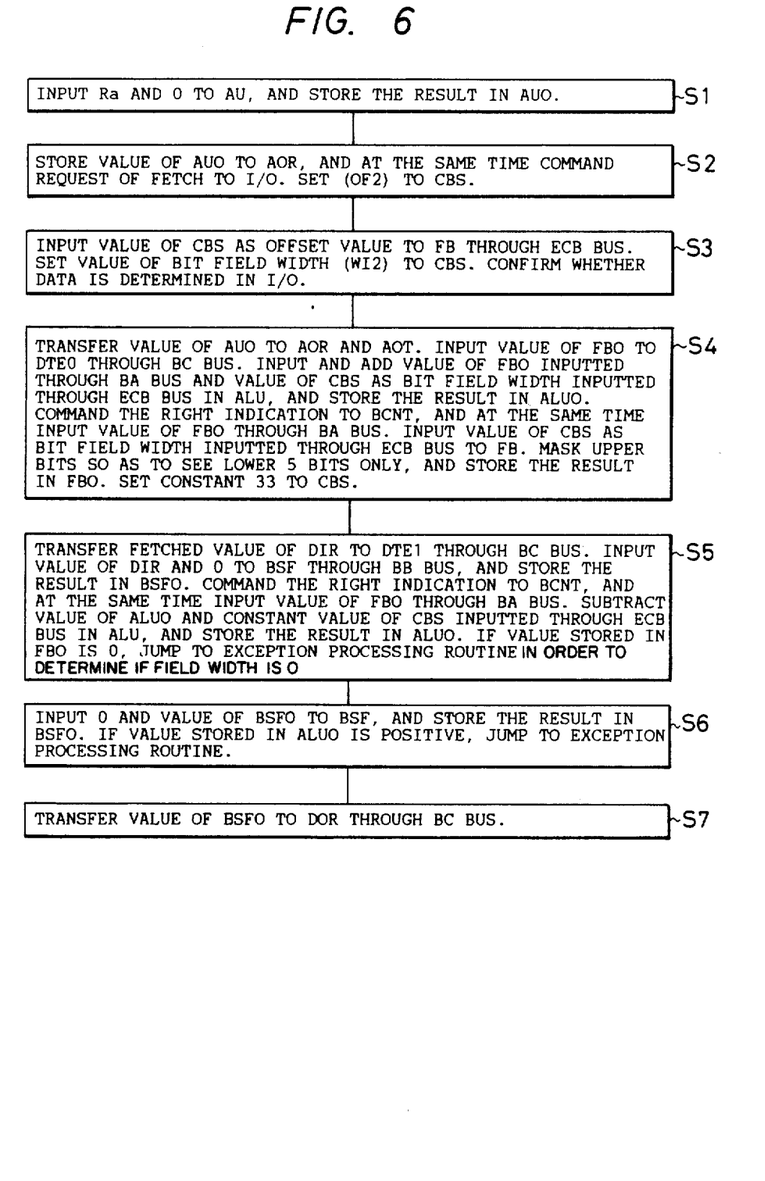
FIG. 6 is a flowchart illustrating an execution procedure of a bit field instruction with limitation according to the invention.

Next, FIG. 5 shows a flowchart representing a procedure in the effective unit when the bit field instruction without limitation shown in FIG. 1A is executed, and FIG. 6 shows a flowchart representing an execution procedure of the bit field instruction with limitation as shown in FIG. 1B.

An instruction in FIG. 5 and FIG. 6 represents, for example, a sequence of instructions fetching a bit field within the memory into a general-purpose register, and characters written as the abbreviations in the figures mean the same content as that of symbols defined in the description of FIG. 1 and FIG. 4.

At first, an execution procedure of the bit field instruction without limitation shown in FIG. 5 will be described in sequence. When processing a sequence of the instruction is executed, a source-base address, offset value and bit field width have been already stored in the registers Ra, Rx, Ry respectively.

At the first step S01, a value within the register Rx, i.e., offset value address indicating a position containing the offset value, is inputted through bus BA or BB to the address operation unit AU and also 0 is inputted thereto by the constant input function, and the addition result is stored in the register AUO.

At the second step S02, an address value (offset value address) stored in the register AUO at the step S01 is transferred to the register AOR, and a request command is given so that data on the external data bus is fetched to the I/O interface. Thereby the address value within the register AOR is outputted through the I/O interface onto the external address bus, and the external memory is accessed and the content is outputted onto the data bus. Data read from the memory, i.e., the offset value Off is fetched by the I/O interface.

At the third step S03, confirmation is performed regarding whether data fetched is valid based on a signal outputted from the I/O interface. Thereby the data is fetched to the data input register DIR. Together with this, at the step S03, value of the register Ra, i.e., the source-base address BAD is inputted through bus BA or BB to the address operation unit AU and also 0 is inputted thereto by the constant input function, and the addition result is stored in the register AUO.

At the fourth step S04, value of the register AUO (source-base address) is transferred to the register AOR, and further transferred through the bus BC to the temporary register DTE0.

When the operation result in the address operation unit AU is transferred from the register AUO to AOR in connection with other processing, it is transferred also to the register AOT automatically. In this case, the transfer to the register AOT has no particular meaning. In concurrence with this, 0 is inputted to the address operation unit AU by the constant input function, and content of the data input register DIR (offset value) is inputted thereto in symbol expansion through the bus BB and the operation result is stored in the register AUO. Further, holding value, i.e., the bit field width WD is supplied from the register Ry to the function block FB through the bus BA, and upper 27 bits except lower 5 bits are masked in the function block FB and the result is stored in the register FBO. The extraction of the lower 5 bits only of the bit field width has the same meaning in the mathematical expression as that the bit field width is divided by number 32 and the remainder is estimated. The lower 5 bits of the bit field width are hereinafter written as fraction WD*. Estimation of the fraction WD* in this step is intended for use in discrimination of the boundary spreading at later step S09.

At the step S05, the value of the register AUO, i.e., the offset value Off is transferred through the bus BC to the temporary register DTE1. At the same time, the value of the register AUO (offset value) and value of the temporary register DTE0, i.e., value of the source-base address BAD, shifted by 3 bits towards the upper bits by the shifter SFT, is supplied to the address operation unit AU, and the addition result is stored in the register AUO. The shift of the source-base address BAD by 3 bits towards the upper bits is intended for expansion of the base address BAD by dividing the memory space in byte units for indication so that it can indicate a position within the memory space in bit units. Consequently, the register AUO then contains a distance of the estimated bit field from address 0 expressed in a bit number. This distance is written as L.

At the sixth step S06, value of the register AUO, i.e., value of the base address shifted by 3 bits towards upper side and added by the offset value Off, is transferred to the register AOT. On the other hand, the source-base address BAD is inputted from the temporary register DTE0 to the address operation unit AU through the bus BA and also the value of the offset value Off transferred from the temporary register DTE1 and shifted by 3 bits towards the lower bits by the shifter SFT is inputted thereto through the bus BB and added, and value of the addition result masked at the lower 2 bits is stored in the register AUO. Together with this, the value WD* in the register FBO, i.e., the lower 5 bits of the bit field width are transferred through the bus BC to temporary register DTE3.

In the above-mentioned case, the offset value shifted by 3 bits towards the lower bits is added to the base address by the address operation unit AU so as to estimate the execution address of a byte unit being most close to the top end of the bit field as an object. The lower 2 bits of the addition result in the address operation unit AU are masked so as to obtain an address of the word of 32 bits including a whole bit field as object or the top end portion thereof.

At the seventh step S07, the word address in the register AUO obtained in the above-mentioned manner is transferred to the address register AOR and outputted through the I/O interface to outside, and at the same time request of the fetch of data on the external data bus is commanded to the I/O interface. Thereby the fetch of the word including the top end portion of the intended bit field from the memory is started. In concurrence with this, the address held in the register AUO is transferred to the temporary register DTE2 through the bus BC. This data is used in execution of a microinstruction other than a bit field instruction. Value L indicating the bit position of the bit field from address 0 obtained at the step S05 is supplied to the function block FB from the register AOT through the bus BA, and the result is stored in the register FBO. Thereby the top end position Off* (This is also one offset value and hereinafter referred to as "secondary offset".) of the bit field from the word address (coincident with the base address if the offset is 31 or less) including the top end portion of the intended bit field obtained at the step S06 is held in the register FBO.

At the step S08, the value Off* (secondary offset) in the register FBO is transferred to the temporary register DTE2 through the bus BC. Together with this, the value WD* (lower 5 bits of the bit field width) in the temporary register DTE3 and the value Off* in the register FBO are supplied and added to the operational logical unit ALU through the buses BA and BB, and the result is stored in the register ALUO. Together with this, constant "33" is set to the register CBS from side of the control unit. Number "33" corresponds to the bit number "32" of one word added by "1". Based on signal from the I/O interface, confirmation is performed regarding whether the fetched data, i.e., content of the bit field is valid based on the signal outputted from the I/O interface determined. If data is determined, it follows that the data is fetched in the data input register DIR.

At the step S09, value fetched by the I/O interface is transferred from the data input register DIR through the bus BC to the temporary register DTE2. In concurrence with this, subtraction of the value "33" of the register CBS from the value (Off*+WD*) of the ALU is performed in the operation logical unit ALU, and the result is stored in the register ALUO. If the subtraction result is positive, it means that the bit field spreads through two words; if the result is negative, it means that the bit field is contained within one word.

Also at the step S09, assignment of the shift direction and the shift amount is performed for the bit shift processing to be performed in the barrel shifter BSF at next step. More specifically, command of the right shift is given to the barrel shifter counter BCNT, and the value Off* in the register FBO is supplied as the shift amount to the barrel shifter counter BCNT through the bus BA.

Figure 8:
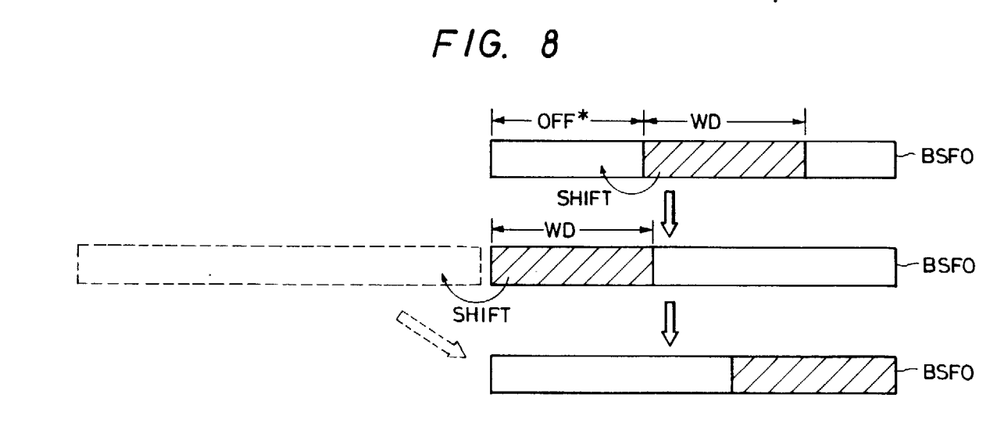
FIG. 8 is an explanation diagram illustrating a position of a bit field in a register after shift by a barrel shifter.

At the step S10, value of the temporary register DTE2, i.e., content of the bit field fetched from the memory is supplied to the barrel shifter BSF through the bus BB, and 0 is inputted by the constant input function and the shift is executed according to command of the barrel shift counter BCNT, and the result is stored in the register BSFO. Thereby, as shown in FIG. 8, content of the fetched bit field is stored in the register BSFO of 32 bits at gathering state to the left end, i.e., at filling state from upper bit side of the register in sequence. In concurrence with this, at the step S10, assignment of the direction and the shift amount is performed for the shift operation to be performed in the barrel shifter BSF at next step. That is, command of the right shift is given to the barrel shifter counter BCNT, and the bit field width WD* in the temporary register DTE3 is supplied as the shift amount through the bus BA.

At the step S11, value of the register BSFO and "0" are inputted to the barrel shifter BSF, and the shift operation is executed according to the assigned direction and the shift amount, and the result is stored in the BSFO. If content of the bit field contained in the register BSFO is shifted to the right by the field width WD*, content of the bit field fetched as shown in FIG. 8 is stored in the register BSFO of 32 bits at gathering state to the right end, i.e., at filling state from lower bit side of the register in sequence as desired.

At the step S12, content of the bit field obtained in such manner is stored from the register BSFO through the bus BC in Rb, one of the general-purpose registers.

Further, at the step S09, if the subtraction result between the sum of Off* and WD* and the constant "33" becomes positive and the boundary spreading of the bit field is determined, process is returned from the step S12 to the step S08 again and the above-mentioned procedure is repeated thereby all content of the bit field spreading through a plurality of words can be read.

Figure 7:
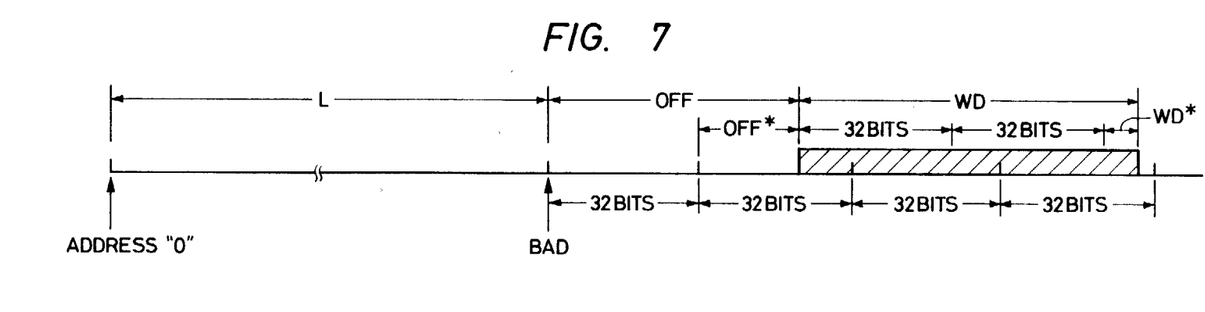
FIG. 7 is an explanation diagram illustrating relation between an offset value and a bit field width.

FIG. 7 shows relation of the offset value Off and the bit field width WD in the micro flow to the secondary offset Off* and the fraction WD*.

In the execution procedure of the bit field instruction without limitation according to the micro flow of FIG. 5, the boundary spreading is determined based on whether the result of the subtraction of the number "33" from sum of the secondary offset Off* and the fraction WD* of the bit field is positive or negative. Originally, the boundary spreading should be discriminated from the primary offset Off and the bit field width WD, and description of such micro flow is possible. As clearly seen from FIG. 7, however, quite the same result can be obtained in the case that the bit field width WD is added to the primary offset Off and the addition result is divided per every 32 bits from the base address BAD thereby existence of the boundary spreading is discriminated and in the case of the embodiment that the fraction WD* of the bit field is added to the secondary offset Off* and the boundary spreading is discriminated based on whether the addition result exceeds the number "32".

Next, execution procedure of the bit field instruction with limitation shown in FIG. 6 will be described in sequence. When processing sequence of the instruction is executed, source-base address, been already stored in the register Ra.

At the first step 11, value within the register Ra, i.e., the base address BAD is inputted through the bus BA or BB to the address operation unit AU and also 0 is inputted thereto by the constant input function, and the addition result is stored in the register AUO.

At the second step S2, the base address stored in the register AUO at the step S1 is transferred to the register AOR, and request command is given so that data on the external data bus is fetched to the I/O interface. Thereby the base address within the register AOR is outputted through the I/O interface onto the external address bus, and the external memory is accessed and the content is outputted onto the data bus. Data read from the memory, i.e., word including the intended bit field is fetched by the I/O interface. Together with this, the offset value Off is set from the side of the instruction register to the register CBS (The offset value and the bit field width are given as immediate value in a third word of the instruction.).

At the third step S3, the offset value within the register CBS is inputted to the function block FB through the bus ECB, and the inputted offset value in that state is stored in the register FBO, and the bit field width WD in place of the offset value is set to the register CBS. Confirmation is performed regarding whether data fetched based on signal outputted from the I/O interface is determined. Thereby the data is fetched to the data input register DIR.

At the fourth step S4, value of the register AUO (base address) is transferred to the register AOR (and AOT), and value of the register FBO (offset value) is inputted through the bus BC to the temporary register DTEO. In concurrence with this, value of the register FBO (offset value) and value of the register CBS (bit field width) are supplied and added to the operational logical unit ALU through the buses BA, ECB, and the result is stored in the register ALUO.

Further, at the step S4, assignment of the shift direction and the shift amount is performed for the bit shift processing to be performed in the barrel shifter BSF at the next step. More specifically, command of the right shift is given to the barrel shifter counter BCNT, and the value Off within the register FBO is supplied as the shift amount to the barrel shifter counter BCNT through the bus BA.

The bit field width WD is inputted from the register CBS through the bus ECB to the function block FB where upper 27 bits except lower 5 bits are masked, and the result (fraction WD*) is stored in the register FBO. Constant "33" is set in place of the bit field width to the register CBS. Number "33" is the bit number "32" of one word added by "1".

Thus at the step S4, preparation is performed for the discrimination of the boundary spreading to be performed at next step S6.

At the fifth step S5, value fetched to the data input register DIR (content of the bit field) is transferred through the bus BC to the temporary register DTE1. In concurrence with this, value of the data input register DIR is inputted through the bus BB to the barrel shifter BSF and also 0 is inputted thereto by the constant input function, and the shift is executed according to command of the barrel shift counter BCNT, and the result is stored in the register BSFO. Thereby, content of the fetched bit field is stored in the register BSFO of 32 bits at gathering state to the left end, i.e., at filling state from upper bit side of the register in sequence. In concurrence with this, at the step S5, assignment of the direction and the shift amount is performed for the shift operation to be performed in the barrel shifter BSF at next step. That is, command of the right shift is given to the barrel shifter counter BCNT, and the bit field width WD* in the register FBO is supplied as the shift amount through the bus BA.

Further at the step S5, value of the register ALUO (Off+WD*) and value of the register CBS (constant "33") are supplied to the operation logical unit ALU and subtraction between both values is performed, and the result is stored in the register ALUO. Together with this, discrimination is performed regarding whether value stored in the register FBO at the step S4 is 0, i.e., whether the bit field width is 0. If the bit field width is 0, it is deemed not to be the bit field instruction and process is jumped to the exception processing routine.

At the step S6, value of the register BSFO and value "0" are inputted to the barrel shifter BSF, and the shift operation is executed according to the assigned direction and the shift amount, and the result is stored in the register BSFO. If content of the bit field contained in the register BSFO is shifted to the right by the field width WD*, content of the fetched bit field is stored in the register BSFO of 32 bits at gathering state to the right end, i.e., at filling state from lower bit side of the register in sequence as required.

At the step S7, content of the bit field obtained in such manner is stored from the register BSFO through the bus BC in Rb, one of the general-purpose registers.

Further, at the step S6, if the subtraction result between the sum of the offset value Off and the fraction WD* and the constant "33" stored in the register ALUO becomes positive and the boundary spreading of the bit field is discriminated, process is jumped to the exception procesing routine on account of error of the instruction. If it is assumed that the bit field instruction with limitation is not used by mistake, the above-mentioned discrimination of the boundary spreading and sequence for its preparation may be omitted.

In the instruction sequence of FIG. 5 and FIG. 6, although the instruction of fetching a bit field within the memory into a general-purpose register has been described, instruction of fetching a bit field within the memory and inserting it into another position of the memory can be executed also according to a similar sequence. In this case, the destination address is indicated by the general-purpose register Rb.

It is understood from FIG. 6 that the bit field instruction with limitation according to the invention has the instruction execution time decreased by five steps, i.e., five machine cycles in comparison to the bit field instruction without limitation shown in FIG. 1A.

Although the embodiment has disclosed the instruction form of the bit field instruction with limitation where in the third half-word the offset value together with the bit field width is given as immediate value, the instruction form of the bit field instruction with limitation is not limited thereto, but, in the first half-word, the offset value is given at the operand assignment portion composed of the addressing mode assignment portion and the register number assignment portion in similar manner to the instruction without limitation of FIG. 1A. The source-base address operand assignment portion SR included in the first half-word of the bit field instruction with limitation of FIG. 1B may be entered in the second half-word, and the destination operand assignment portion DE2 of the second half-word may be entered in the half-word and moreover the register number may be entered here in similar manner to the instruction of FIG. 1A so that the destination is assigned in the register direct addressing.

In such an arrangement, difference of the format of the bit field instruction with limitation or without limitation is only in that the offset value is given in the third half-word by immediate value or by register direct processing, thereby the instruction format has similarity.

According to the invention, the following effects can be obtained.

In addition to ordinary bit field instruction without limitation in the offset value and the field width, the bit field instruction with limitation is separately installed where the instruction form has the assignment portion for giving the offset value and the field width as immediate value and the discrimination of the boundary spreading based on the offset value and the field width is not performed. Thereby calculation for the discrimination of the boundary spreading is not performed although required to execute the bit field instruction with limitation, and the offset value and the field width can be obtained directly as immediate value. Accordingly, in comparison to the bit field instruction without limitation to perform the discrimination of the boundary spreading, the execution time of the instruction regarding the bit field contained within one word is decreased.

The invention made by the inventor has been described concretely based on the embodiments, however, the invention is not limited to the embodiments but may be, of course, modified variously in a scope without departing from the subject matter thereof.

Although the invention made by the inventor has been described mainly in the case that it is applied to the instruction form of a microprocessor being the utilization field as the background of the invention, the invention is not limited thereto but can be utilized in the instruction form of the data processing system in general of the program control system such as a computer or a minicomputer.

What is claimed is:

1. A data processing system, comprising:
   execution means for executing instructions, said instructions including an instruction for processing a field which contains two or more words within a memory and an instruction for processing a field which is contained within one word of said memory; and
   said execution means including means for calculating a bit width of each field to be processed by said instruction to determine the number of bits in each field;
   wherein said execution means, when executing an instruction, determines whether said instruction is an instruction for processing a field which is contained within one word and if said instruction is an instruction for processing a field which is contained within one word, a calculation of a bit width of said field of said instruction is omitted;
   wherein said field of said instruction for processing a field contained within one word is designated by operands of a base address indicating an address as a reference, an offset value indicating a number of bits from the base address to a starting end of said field, and a field width indicating a number of bits in said field, said operands being included within said instruction for processing a field contained within one word;
   wherein said instruction for processing a field contained within one word is supplied with an offset value as an immediate value by said execution means in response to an operand of said instruction;
   wherein said instruction for processing a field contained within one word is supplied with a field width as an immediate value by said execution means in response to an operand of said instruction; and
   wherein said instructions are each composed of three half-words.

2. The data processing systems as set forth in claim 1, wherein said instruction for processing a field contained within one word is supplied with the offset value and the field width as immediate values by said execution means in response to operands of said instruction, and the offset value and the field width operands are installed within the same half-word of said instruction.

3. The data processing system as set forth in claim 2, wherein said offset value and said field width operands are installed within the third half-word of said instruction.

4. The data processing system as set forth in claim 2, wherein the offset value and the field width operands are each composed of 5 bits.

5. The data processing system as set forth in claim 1, wherein said instruction for processing a field which contains two or more words is provided with an operand assignment portion for obtaining an offset value by register indirect addressing.

6. The data processing system as set forth in claim 1, wherein said instruction for processing a field which contains two or more words is provided with an operand assignment portion for obtaining a field width by register direct addressing.

* * * * *